(12) United States Patent
Liu

(10) Patent No.: US 10,103,986 B2
(45) Date of Patent: Oct. 16, 2018

(54) METHOD, APPARATUS AND SYSTEM FOR DETERMINING CONTENT ACQUISITION PATH AND PROCESSING REQUEST

(71) Applicant: Huawei Technologies Co., Ltd., Shenzhen (CN)

(72) Inventor: Shucheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 15/011,106

(22) Filed: Jan. 29, 2016

(65) Prior Publication Data

US 2016/0149810 A1    May 26, 2016

Related U.S. Application Data

(63) Continuation of application No. PCT/CN2014/081869, filed on Jul. 9, 2014.

(30) Foreign Application Priority Data

Jul. 31, 2013  (CN) .......................... 2013 1 0329105

(51) Int. Cl.
*H04L 12/747*  (2013.01)
*H04L 12/64*   (2006.01)
(Continued)

(52) U.S. Cl.
CPC ........ *H04L 45/742* (2013.01); *H04L 12/6418* (2013.01); *H04L 45/12* (2013.01);
(Continued)

(58) Field of Classification Search
CPC .............. H04L 45/742; H04L 12/6418; H04L 67/2842; H04L 45/124; H04L 45/12; H04L 45/745; H04L 45/306; H04L 67/327
See application file for complete search history.

(56) References Cited

U.S. PATENT DOCUMENTS 7,688,753 B1    3/2010 Zimran et al.
8,539,036 B2    9/2013 Kohli et al.
(Continued)

FOREIGN PATENT DOCUMENTS

CN    101741715 A    6/2010
CN    101971597 A    2/2011
(Continued)

*Primary Examiner* — Ajay Cattungal
(74) *Attorney, Agent, or Firm* — Leydig, Voit & Mayer, Ltd.

(57) ABSTRACT

The present disclosure provide a method for determining a content acquisition path, a method for processing a content request and a corresponding apparatus and system. The method for determining the content acquisition path includes: receiving a request from a user, where the request is used for requesting an original content provider to provide a content, and the request carries a name of the content, a network address of the original content provider and a network address of the user; calculating at least two forwarding paths to the original content provider, and determining a content acquisition path according to link cost on each forwarding path and a cache hit rate of a network node on each forwarding path to the content; and sending the request to a next network node according to the content acquisition path, for enabling the next network node to forward or respond to the request.

19 Claims, 10 Drawing Sheets

(51) Int. Cl.
*H04L 29/08* (2006.01)
*H04L 12/721* (2013.01)
*H04L 12/741* (2013.01)
*H04L 12/725* (2013.01)

(52) U.S. Cl.
CPC .......... *H04L 45/124* (2013.01); *H04L 45/306* (2013.01); *H04L 45/745* (2013.01); *H04L 67/2842* (2013.01); *H04L 67/327* (2013.01)

(56) References Cited

U.S. PATENT DOCUMENTS

| | | |
|---|---|---|
| 2005/0144317 A1 | 6/2005 | Chase et al. |
| 2009/0234965 A1 | 9/2009 | Viveganandhan et al. |
| 2010/0124233 A1* | 5/2010 | Shi .................... H04L 45/00 370/401 |
| 2011/0173304 A1* | 7/2011 | Schlack ............. H04L 65/4084 709/220 |
| 2012/0239775 A1 | 9/2012 | Hubbard et al. |
| 2012/0257560 A1* | 10/2012 | Srinivasan ............ H04W 4/18 370/312 |
| 2013/0041982 A1 | 2/2013 | Shi et al. |
| 2013/0326133 A1* | 12/2013 | Lee .................. G06F 17/30982 711/108 |
| 2014/0089594 A1 | 3/2014 | Long |
| 2014/0115120 A1 | 4/2014 | Li et al. |
| 2014/0157324 A1* | 6/2014 | Mao ...................... G06F 17/301 725/54 |

FOREIGN PATENT DOCUMENTS

| | | |
|---|---|---|
| CN | 102118434 A | 7/2011 |
| CN | 102143199 A | 8/2011 |
| CN | 102204218 A | 9/2011 |
| CN | 102316390 A | 1/2012 |
| CN | 102647357 A | 8/2012 |
| CN | 102685177 A | 9/2012 |
| CN | 102685179 A | 9/2012 |
| CN | 102790809 A | 11/2012 |
| EP | 2501104 A1 | 9/2012 |
| WO | WO 2010140935 A1 | 12/2010 |
| WO | 2013086707 A1 | 6/2013 |

* cited by examiner

METHOD, APPARATUS AND SYSTEM FOR DETERMINING CONTENT ACQUISITION PATH AND PROCESSING REQUEST

CROSS-REFERENCE TO RELATED APPLICATIONS

This application is a continuation of International Application No. PCT/CN2014/081869, filed on Jul. 9, 2014, which claims priority to Chinese Patent Application No. 201310329105.7, filed on Jul. 31, 2013, both of which are hereby incorporated by reference in their entireties.

TECHNICAL FIELD

The present disclosure relates to the field of communications, and in particular, to a method, an apparatus and a system for determining a content acquisition path and processing a request.

BACKGROUND

According to statistics issued by a Cisco visual network index (VNI), more than 90% of internet traffic in 2011 is file sharing, videos and web pages. According to its forecast, this proportion will continue to increase, and it is estimated that only video traffic will occupy 54% of entire internet traffic by 2016.

When acquiring such contents as files, videos, web pages and the like, different users usually request for a same content repeatedly. An existing IP network is host-centric, and if a transmission of a content is to be performed, an end-to-end connection needs to be established, namely: each user is required to establish a connection with an original content provider respectively, and then the original content provider sends a content requested by the user wholly to the user. In this approach, on one hand, the original content provider needs to handle with a large number of user requests, easily causing slow response or even denial of service; on the other hand, links in the network need to transmit a same content many times, causing waste of network resources. Therefore, how to effectively submit a content is a difficult problem of the current internet.

In recent years, the academia has started to research on how to transform the traditional host-centric IP network into a content-centric IP network. What is more representative is an NDN (Named Data Networking) project and the like supported by Future Internet Architecture (FIA) of U.S. National Science Foundation (NSF), as well as a PSIRP (Publish-Subscribe Internet Routing Paradigm) project and the like supported by European Seventh Framework Program (Framework Program 7, FP7). Most of these projects propose to cache a content and respond to a content request by means of a cache of a network device (e.g., a router), namely: the network device may determine to cache the content or not when submitting the content, and when forwarding the content request, return a result immediately if hitting the local cache.

At present, most of solutions are as follows: each network device on a path from the user to the original content provider determine to return the content to the user or forward the request according to whether the local cache hits the content or not. However, since the cache of the network device is limited, not all contents may be cached, meanwhile, a study shows that the content request has a regional characteristic (i.e., users with close geographical locations may request similar contents), hit rates of a same content in different caches are different (that is, different contents may be cached in different network devices), therefore, the cache in the network could not be effectively utilized by performing routing in the existing path calculating manner.

SUMMARY

A technical problem to be solved by embodiments of the present disclosure is to provide a method, an apparatus and a system for determining a content acquisition path and processing a content request, for solving a problem in the prior art that a cache in a network could not be effectively utilized in a routing process of a content request.

To solve the above-mentioned technical problem, in a first aspect, a method for determining a content acquisition path is provided, including:

receiving, by a first network node, a request from a user, where the request is used for requesting an original content provider to provide a content, and the request carries a name of the content, a network address of the original content provider and a network address of the user;

calculating at least two forwarding paths to the original content provider, and determining a content acquisition path according to link cost on each forwarding path and a cache hit rate of a network node on each forwarding path to the content; and sending the request to a next network node according to the content acquisition path, for enabling the next network node to forward or respond to the request.

As a first possible implementation manner of the first aspect, the method further includes: acquiring the cache hit rate of the network node on the each forwarding path to the content; the cache hit rate of the network node on the each forwarding path to the content is acquired in the following manners: inquiring the cache hit rate of the network node on each forwarding path to the content in a cache hit rate information table stored locally, or inquiring a cache hit rate of a cache network node on each forwarding path to the content in the cache hit rate information table, where the cache network node is a network node responsible for caching the content, or further, during the inquiring process, if there is at least one network node of which a cache hit rate to the content could not be acquired by inquiring the cache hit rate information table, presetting the cache hit rate of the at least one network node to the content according to a whole hit rate condition of the at least one network node.

In combination with the first aspect or the first possible implementation manner of the first aspect, a second possible implementation manner of the first aspect is further provided, where the determining the content acquisition path according to the link cost on each forwarding path and the cache hit rate of the network node on each forwarding path to the content, includes: calculating path cost $C=C_{1,n}$ of each forwarding path respectively, where, $C_{i,n}=\Phi_{i+1}R_{i+1}+P_{i,i+1}+(1-\Phi_{i+1}R_{i+1})(P_{i,i+1}+C_{i+1,n})$, ($i<n$), the n is a quantity of network nodes on a forwarding path calculated currently, when a (i+1)th network node in n network nodes is responsible for caching the content, the $\Phi_{i+1}=1$, otherwise, the $\Phi_{i+1}=0$, the $R_{i+1}$ is a cache hit rate of the (i+1)th network node to the content, the $P_{i,i+1}$ is link cost from a ith network node to the (i+1)th network node in the n network nodes, and the $C_{i,n}$ is path cost from the ith network node to a nth network node in the n network nodes; and selecting a forwarding path with a minimum path cost from the at least two forwarding paths as the content acquisition path.

In combination with the first or second possible implementation manner of the first aspect, a third possible implementation manner of the first aspect is further provided, where the method further includes: receiving a content data packet generated by a cache network node hitting the content or generated by the original content provider, where the content data packet carries hit rate information of all cache network nodes passed by the request to the content; and extracting the hit rate information in the content data packet, and updating hit rate information of corresponding network nodes to the content stored locally.

In the second aspect, a method for processing a request is provided, including:

receiving, by a cache network node, a request from a user, where the request is used for requesting an original content provider to provide a content, the request carries a name of the content, a network address of the original content provider and a network address of the user, and the cache network node is a network node responsible for caching the content;

checking a local cache, if hitting the content, updating a hit rate of the local cache to the content, generating a content data packet, and sending the content data packet to the user as a response to the request, where the content data packet carries hit rate information of the cache network node to the content, or, checking a local cache, if not hitting the content, updating a hit rate of the local cache to the content, and sending the request to the original content provider after performing the following process on the request: carrying hit rate information of the cache network node to the content in the request.

As a first possible implementation manner of the second aspect, in a condition that the cache network node hits the content, if the request further carries hit rate information of other cache network nodes to the content, the cache network node extracts the hit rate information and carries the hit rate information in the content data packet, where the other cache network nodes are nodes passed by the request before arriving at the cache network node.

As a second possible implementation manner of the second aspect, in a condition that the cache network node does not hit the content, the sending the request to the original content provider after performing the following process on the request includes: determining, by the cache network node, a next hop according to content acquisition path information carried in the request; or, calculating, by the cache network node, at least two forwarding paths to the original content provider, determining a content acquisition path according to link cost on each forwarding path and a cache hit rate of a network node on each forwarding path to the content, and determining a next hop according to the determined content acquisition path.

In combination with the second aspect or the second possible implementation manner of the second aspect, a third possible implementation manner of the second aspect is further provided, where in a condition that the cache network node does not hit the content, the method further includes: receiving, by the cache network node, a content data packet generated by a cache network node hitting the content or generated by the original content provider, where the content data packet carries hit rate information of all cache network nodes passed by the request to the content; sending the content data packet to the user, or, extracting the hit rate information in the content data packet, updating hit rate information of corresponding network nodes to the content stored locally, and sending the content data packet to the user.

In the third aspect, a network node for determining a content acquisition path is provided, including:

a first receiving unit, configured to receive a request from a user, where the request is used for requesting an original content provider to provide a content, and the request carries a name of the content, a network address of the original content provider and a network address of the user;

a calculating unit, configured to calculate at least two forwarding paths to the original content provider, and determine a content acquisition path according to link cost on each forwarding path and a cache hit rate of a network node on each forwarding path to the content; and a forwarding unit, configured to send the request to a next network node according to the content acquisition path, for enabling the next network node to forward or respond to the request.

As a first possible implementation manner of the third aspect, the network node further includes an acquiring unit, configured to acquire the hit rate of the network node on the each forwarding path to the content; the acquiring unit includes a storage module and an inquiry module, or includes a storage module, an inquiry module and a presetting module, where, the storage module is configured to store cache hit rate information of each network node in a network, the inquiry module is configured to inquire the cache hit rate of the network node on each forwarding path to the content through the storage module, or is configured to inquire a cache hit rate of a cache network node on each forwarding path to the content through the storage module, and the cache network node is a network node responsible for caching the content, and the presetting module is invoked only when there is at least one network node of which a cache hit rate to the content could not be determined through the inquiry module, and the presetting module is configured to preset the cache hit rate of the at least one network node to the content according to a whole hit rate condition of the at least one network node.

In combination with the third aspect or the first possible implementation manner of the third aspect, a second possible implementation manner of the third aspect is further provided, where the calculating unit includes:

a calculating module, configured to calculate path costs $C=C1,n$ of each forwarding path respectively, where, $C_{i,n}=\Phi_{i+1}R_{i+1}P_{i,i+1}+(1-\Phi_{i+1}R_{i+1})(P_{i,i+1}+C_{i+1,n})$, ($i<n$), the n is a quantity of network nodes on a forwarding path calculated currently; when a (i+1)th network node in n network nodes is responsible for caching the content, the $\Phi_{i+1}=1$, otherwise, the $\Phi_{i+1}=0$; the $R_{i+1}$ is a cache hit rate of the (i+1)th network node to the content; the $P_{i,i+1}$ is link cost from a ith network node to the (i+1)th network node in the n network nodes; and the $C_{i,n}$ is path cost from the ith network node to a nth network node in the n network nodes; and a determining module, configured to select a forwarding path with a minimum path cost from the at least two forwarding paths as the content acquisition path.

In combination with the first or second possible implementation manner of the third aspect, a third possible implementation manner of the third aspect is further provided, where the network node further includes: a second receiving unit, configured to receive a content data packet generated by a cache network node hitting the content or generated by the original content provider, where the content data packet carries hit rate information of all cache network nodes passed by the request to the content; and an updating unit, configured to extract the hit rate information in the content data packet, and update hit rate information of corresponding network nodes to the content stored locally.

In the fourth aspect, a cache network node is provided, including:

a first receiving unit, configured to receive a request from a user, where the request is used for requesting an original content provider to provide a content, the request carries a name of the content, a network address of the original content provider and a network address of the user, and the cache network node is a network node responsible for caching the content;

a first processing unit, configured to check a local cache and perform a process according to a hit condition of the local cache to the content, including:

if hitting the content, updating a hit rate of the local cache to the content, generating a content data packet, and sending the content data packet to the user as a response to the request, where the content data packet carries hit rate information of the cache network node to the content, or, if not hitting the content, updating a hit rate of the local cache to the content, and sending the request to the original content provider after performing the following process on the request: carrying hit rate information of the cache network node to the content in the request.

As a first possible implementation manner of the fourth aspect, the first processing unit includes:

an extracting module, configured to, in a condition that the cache network node hits the content and the request further carries hit rate information of other cache network nodes to the content, extract the hit rate information, where the other cache network nodes are nodes passed by the request before arriving at the cache network node; and an information inserting module, configured to carry the hit rate information extracted by the extracting module in the content data packet.

As a second possible implementation manner of the fourth aspect, the first processing unit includes:

a sending module, configured to, in a condition that the cache network node does not hit the content, determine a next hop according to content acquisition path information carried in the request, or, configured to, in a condition that the cache network node does not hit the content, calculate at least two forwarding paths to the original content provider, determine a content acquisition path according to link cost on each forwarding path and a cache hit rate of a network node on each forwarding path to the content, and determine a next hop according to the determined content acquisition path.

In combination with the fourth aspect or the second possible implementation manner of the fourth aspect, a third possible implementation manner of the fourth aspect is further provided, where the cache network node further includes: a second receiving unit, configured to, in a condition that the cache network node does not hit the content, receive a content data packet generated by a cache network node hitting the content or generated by the original content provider, where the content data packet carries hit rate information of all cache network nodes passed by the request to the content; a second processing unit, configured to send the content data packet to the user, or, extract the hit rate information in the content data packet, update hit rate information of corresponding network nodes to the content stored locally, and send the content data packet to the user.

In the fifth aspect, a system for acquiring a content is provided, including the network node for determining the content acquisition path according to the third aspect of the present disclosure and the cache network node according to the fourth aspect of the present disclosure.

In the embodiments of the present disclosure, the content acquisition path is determined according to the link cost on each forwarding path and the cache hit rate of the network node on each forwarding path to the content, and then routing is performed according to the content acquisition path, a utilization rate of the cache in the network may be effectively improved, and meanwhile, pressure of the original content provider is further alleviated and a utilization rate of link resources is improved.

BRIEF DESCRIPTION OF DRAWINGS

To illustrate technical solutions in embodiments of the present disclosure or in the prior art more clearly, a brief introduction on the accompanying drawings which are needed in the description of the embodiments or the prior art is given below. Apparently, the accompanying drawings in the description below are merely some of the embodiments of the present disclosure, based on which other drawings may be acquired by those of ordinary skill in the art without any creative effort.

DESCRIPTION OF EMBODIMENTS

A clear and complete description of technical solutions in embodiments of the present disclosure will be given below, in combination with the accompanying drawings in the embodiments of the present disclosure. Apparently, the embodiments described below are merely a part, but not all, of the embodiments of the present disclosure. All of the other embodiments, acquired by those of ordinary skill in the art based on the embodiments of the present disclosure without any creative effort, fall into the protection scope of the present disclosure.

Figure 1:
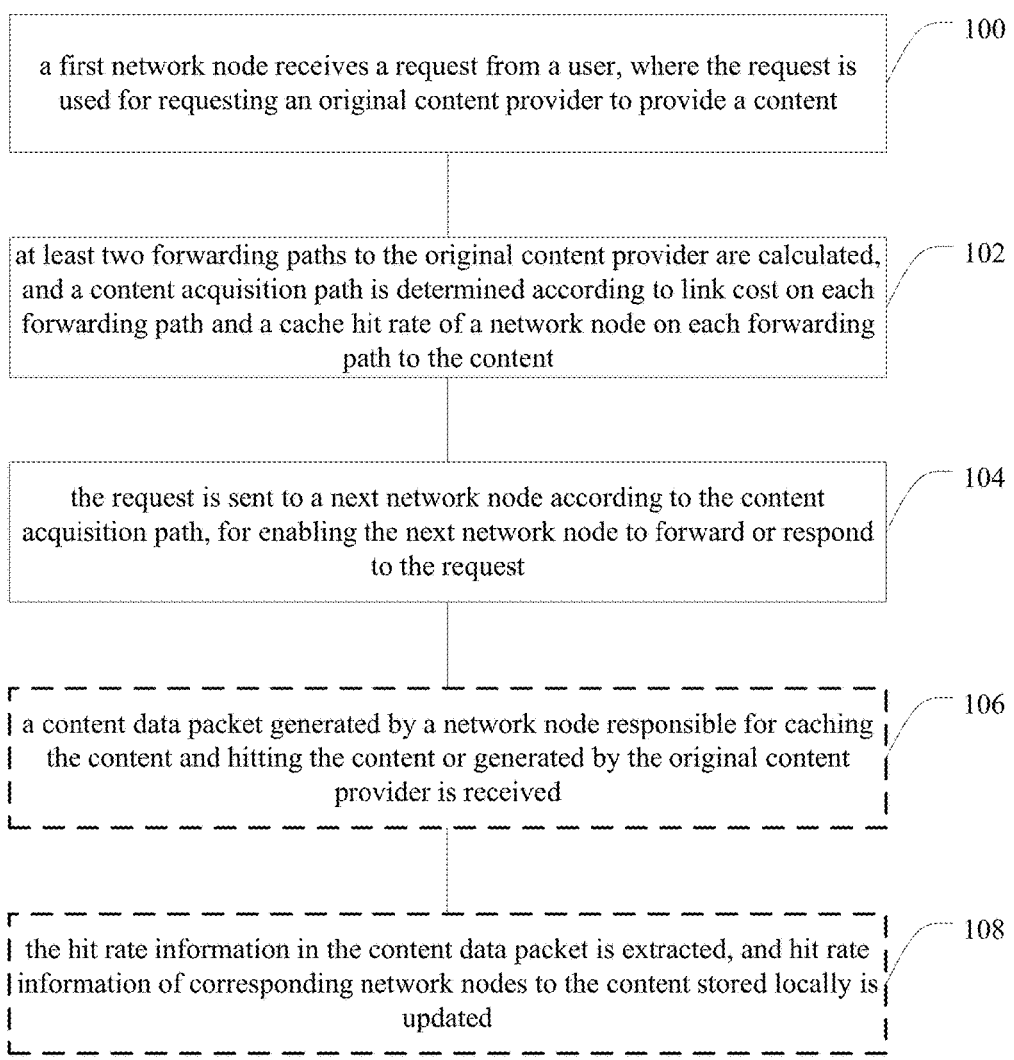
FIG. 1 is a schematic flowchart of a method for determining a content acquisition path according to an embodiment of the present disclosure.

FIG. 1 is a schematic flowchart of a method for determining a content acquisition path according to an embodiment of the present disclosure, and see FIG. 1, the method includes (dashed blocks indicate that steps are optional):

100: a first network node receives a request from a user, where the request is used for requesting an original content provider to provide a content, and the request carries a name of the content, a network address of the original content provider and a network address of the user.

The first network node may perform routing calculation/addressing according to the network addresses (e.g., IP addresses) of the original content provider and the user.

The "name of the content" involved in the present disclosure not only includes a name in a narrow sense, but also includes a mark or an identifier capable of marking the content and having recognition/discrimination significance in a broad sense.

The "request from a user" involved in the present disclosure may be interpreted as that a source address of the request is the user, but is not limited to that the user is connected with a node directly or via a forwarding device (e.g., an intermediate forwarding node), in other words, the request may be forwarded to the first network node by other devices. Similarly, "sending to the user", "sending to the original content provider" or similar expressions involved in the present disclosure do not limit connection manners between nodes.

The first network device includes a device needing to perform routing calculation, for example, an access router.

102: at least two forwarding paths to the original content provider are calculated, and a content acquisition path is determined according to link cost on each forwarding path and a cache hit rate of a network node on each forwarding path to the content.

Optionally, in an embodiment of the present disclosure, a same processing result as 102 may be acquired in the following manner when calculating a shortest path, calculating according to the cache hit rate of each network node to the content comprehensively, so as to directly calculate the content acquisition path.

Optionally, in an implementation manner of the embodiment, prior to 102 or in 102, the method includes: acquiring the cache hit rate of the network node on each forwarding path to the content. For example, the cache hit rate may be acquired in the following manner:

inquiring the cache hit rates of the network node on each forwarding path to the content in a cache hit rate information table stored locally, or inquiring a cache hit rate of a cache network node on each forwarding path to the content in the cache hit rate information table, where the cache network node is a network node responsible for caching the content. It should be noted that, the "network node responsible for caching the content" should be interpreted as that the network node may cache the content instead of certainly caching the content.

During the above-mentioned inquiring process, if there is at least one network node of which a cache hit rate to the content could not be acquired by inquiring the cache hit rate information table (for example, when the first network node receives a request for a certain content for a first time, hit rate information of other network nodes to the content may not be inquired), then the cache hit rate of the at least one network node to the content is preset according to a whole hit rate condition of the at least one network node. Specifically, the hit rate of the at least one network node to the content may be preset according to cache hit rates of the at least one network node to other contents stored in a local cache. For example, if the cache hit rates of the at least one network node to the other contents are low, the preset hit rate of the at least one network node to the content may not be too high either, and a feasible valuing manner is as follows: selecting a minimum value in a set threshold and known hit rates to all contents as a preset value.

When the first network node receives a request for a certain content for a first time, which cache devices in a network may cache the content may be acquired in multiple methods, for example: all cache devices are recorded by a centralized device, and when accessing to the network the first network node acquires cache information of all the cache devices at one time by inquiring; the first network node learns by itself using interaction information (i.e., learning new cache information from content data received each time); each cache device determines which contents it is responsible for by means of a distributed hash table technology, and the first network node may acquire cache information by means of the same technology. In the above-mentioned method, the "cache information" may include: an address of a cache device, storage capacity of a cache device and which contents a cache device stores currently.

Optionally, in an implementation manner of the embodiment, 102 includes:

calculating path cost $C=C_{1,n}$ of each forwarding path respectively, where $C_{i,n}=\Phi_{i+1}R_{i+1}P_{i,i+1}+(1-\Phi_{i+1}R_{i+1})(P_{i,i+1}+C_{i+1,n})$ ((i<n), the n is a quantity of network nodes on a forwarding path calculated currently, when a $(i+1)^{th}$ network node in n network nodes is responsible for caching the content, the $\Phi_{i+1}=1$, otherwise, the $\Phi_{i+1}=0$, the $R_{i+1}$ is a cache hit rate of the $(i+1)^{th}$ network node to the content, the $P_{i,i+1}$ is link cost from a $i^{th}$ network node to the $(i+1)^{th}$ network node in the n network nodes, and the $C_{i,n}$ is path cost from the $i^{th}$ network node to a $n^{th}$ network node in the n network nodes; and selecting a forwarding path with a minimum path cost from the at least two forwarding paths as the content acquisition path.

Of course, the above-mentioned formula is merely an exemplary implementation manner, and routing calculation performed by adopting a calculation method similar to the above-mentioned formula or adopting a variable form of the above-mentioned formula shall fall within the protection scope of the present disclosure.

104: the request is sent to a next network node according to the content acquisition path, for enabling the next network node to forward or respond to the request.

Optionally, in 104, the first network node may forward the request to the next network node in a source routing manner, and in this condition, a path of the request in a whole routing and forwarding process is the content acquisition path. Further optionally, when adopting the source routing manner, a network address of a network node responsible for caching the content may be carried in an IP option (a network address of a network node not necessarily passed is not carried), for enabling the network node responsible for caching the content to check whether a local cache hits the content after receiving the request.

Optionally, in 104, the first network node may also send the request by adopting a tunnel technology, a target address is an address of the next network node, and then, the next network node re-calculates a content acquisition path to perform routing and forwarding by adopting the same method as the first network node. Further optionally, when adopting the tunnel technology, an end of each section of tunnel is a network node responsible for caching the content, specifically: since a tunnel is established section by section, a tunnel from the first network node to a first network node responsible for caching the content is established firstly, the network node at the end of the tunnel may inquire the local cache, then an address of a subsequent network node may be still carried in the IP option (or a method for re-calculating a content acquisition path is adopted), and the current network node having a cache function may establish a tunnel with a next network node having the cache function.

The method for determining the content acquisition path provided by the embodiment may effectively improve a utilization rate of the cache in the network (e.g., compared to a traditional shortest path routing manner), meanwhile, further alleviate pressure of the original content provider and improve a utilization rate of link resources.

Optionally, in an implementation manner of the embodiment, after 104, the method further includes:

106: a content data packet generated by a network node responsible for caching the content and hitting the content (i.e., a cache network node hitting the content) or generated by the original content provider is received, where the content data packet carries hit rate information of all cache network nodes passed by the request to the content.

Taking an IPv4 protocol as an example, the content data packet may carry the hit rate information by the IP option.

It should be noted that, in the present disclosure, although the "network node responsible for caching the content and hitting the content" (hereinafter referred to as a "cache hitting node") and the "original content provider" are described respectively, those skilled in the art should understand that, in the present disclosure, except a difference caused by different positions in the network, the "original content provider" and the "cache hitting node" have a consistency on a function. Namely, a processing manner of the original content provider when receiving the request is the same as a processing manner of the cache hitting node, in other words, the "cache hitting node" includes the "original content provider" in some conditions.

108: the hit rate information in the content data packet is extracted, and hit rate information of corresponding network nodes to the content stored locally is updated.

In the implementation manner, the first network node may update hit rate information of the network node responsible for caching the content to the content in time.

Figure 2:
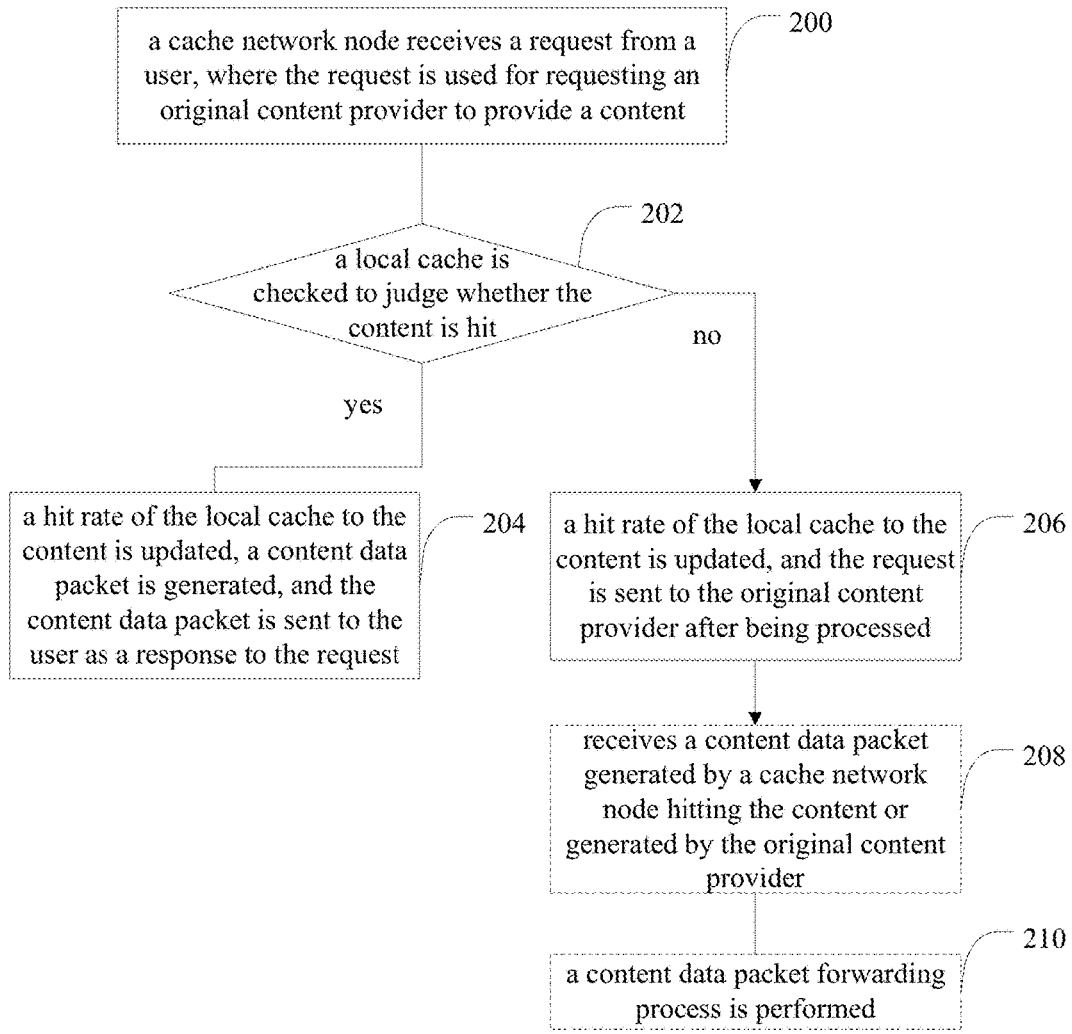
FIG. 2 is a schematic flowchart of a method for processing a request according to an embodiment of the present disclosure.

FIG. 2 is a schematic flowchart of a method for processing a request according to an embodiment of the present disclosure, and see FIG. 2, the method includes:

200: a cache network node receives a request from a user, where the request is used for requesting an original content provider to provide a content, the request carries a name of the content, a network address of the original content provider and a network address (e.g, an IP address) of the user, and the cache network node is a network node responsible for caching the content.

In an implementation manner of the embodiment, the cache network node may be the "next network node" in the embodiment as shown in FIG. 1.

202: a local cache is checked to judge whether the content is hit.

204: if the content is hit, a hit rate of the local cache to the content is updated, a content data packet is generated, and the content data packet is sent to the user as a response to the request, where the content data packet carries hit rate information of the cache network node to the content.

Optionally, in an implementation manner of the embodiment, in 204, if the request further carries hit rate information of other cache network nodes to the content, the cache network node extracts the hit rate information and carries the hit rate information in the content data packet, so as to send the hit rate information and the hit rate information of the cache network node to the content to a first network node (e.g., an access router) together. The other cache network nodes are nodes passed by the request before arriving at the cache network node.

206: if the content is not hit, a hit rate of the local cache to the content is updated, and the request is sent to the original content provider after being performed the following process on: carrying hit rate information of the cache network node to the content in the request.

Optionally, in an implementation manner of the embodiment, sending the above-mentioned processed request to the original content provider includes:

determining, by the cache network node, a next hop according to content acquisition path information carried in the request (for example, when adopting a source routing technology); or, calculating, by the cache network node, at least two forwarding paths to the original content provider, determining a content acquisition path according to link cost on each forwarding path and a cache hit rate of a network node on each forwarding path to the content, and determining a next hop according to the determined content acquisition path (for example, when adopting a tunnel technology). A specific calculating method is the same as the method of the first network node in the embodiment as shown in FIG. 1 for calculating the content acquisition path, and will not be repeated redundantly herein.

According to the method for processing a content request provided by the embodiment, when whether the local cache hits the content is judged, sending or responding is correspondingly performed, and the hit rate information of the current network node to the content is carried in the send request and the responded content data packet, for enabling a network node needing to perform routing calculation (for example, the first network node) to update the corresponding hit rate information in time, so a calculation foundation is provided to the method for determining the content acquisition path provided by the present disclosure.

Optionally, in an implementation manner of the embodiment, in a condition that the content is not hit, the method further includes:

208: the cache network node receives a content data packet generated by a cache network node hitting the content or generated by the original content provider, where the content data packet carries hit rate information of all cache network nodes passed by the request to the content.

210: a content data packet forwarding process is performed, including:

a first possibility: sending the content data packet to the user; or, a second possibility: extracting the hit rate information in the content data packet, updating hit rate information of corresponding network nodes to the content stored locally, and sending the content data packet to the user. The second possibility is applicable to a scenario that the cache network node needs to or may need to perform routing calculation.

Some application scenarios are listed below exemplarily to further illustrate the present disclosure in detail.

Figure 3:
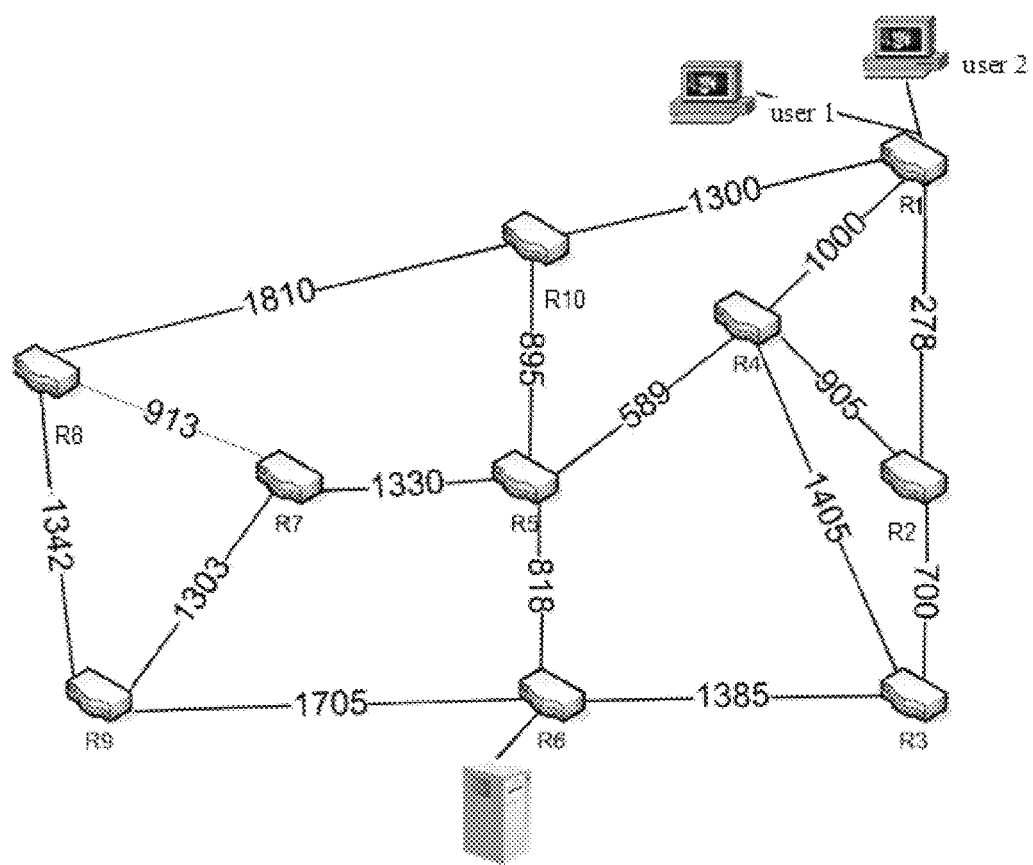
FIG. 3 is a schematic diagram of an adopted network topology according to an embodiment of the present disclosure.

FIG. 3 is a schematic diagram of an adopted network topology according to an embodiment of the present disclosure. See FIG. 3, in the embodiment: a network includes ten routers and sixteen links; a numerical value on each link is link cost of the link (for example, may be such indexes as a weight, a charge or a congestion degree or the like of the link), and the link weight is used as the link cost for routing calculation in the embodiment; two users are connected to an access router R1, and an original content provider is connected with an router R6; each router is configured with a cache, and because of a limited cache capacity, each cache device is responsible for caching a part of all contents respectively; for a same content name, serial numbers of nodes responsible for caching a content are acquired by multiple hash calculations using multiple hash functions (two hash functions are used in the embodiment); each node replaces contents should be cached locally by adopting a least frequently used (LFU) principle; each node is responsible for counting and recording a hit rate to each content in a local cache.

[Specific Implementation Manner 1]

Step 1: a user 1 sends a request packet, where the request packet carries a name of a content 1, an IP address of the original content provider and an IP address of the user 1.

Figure 4:
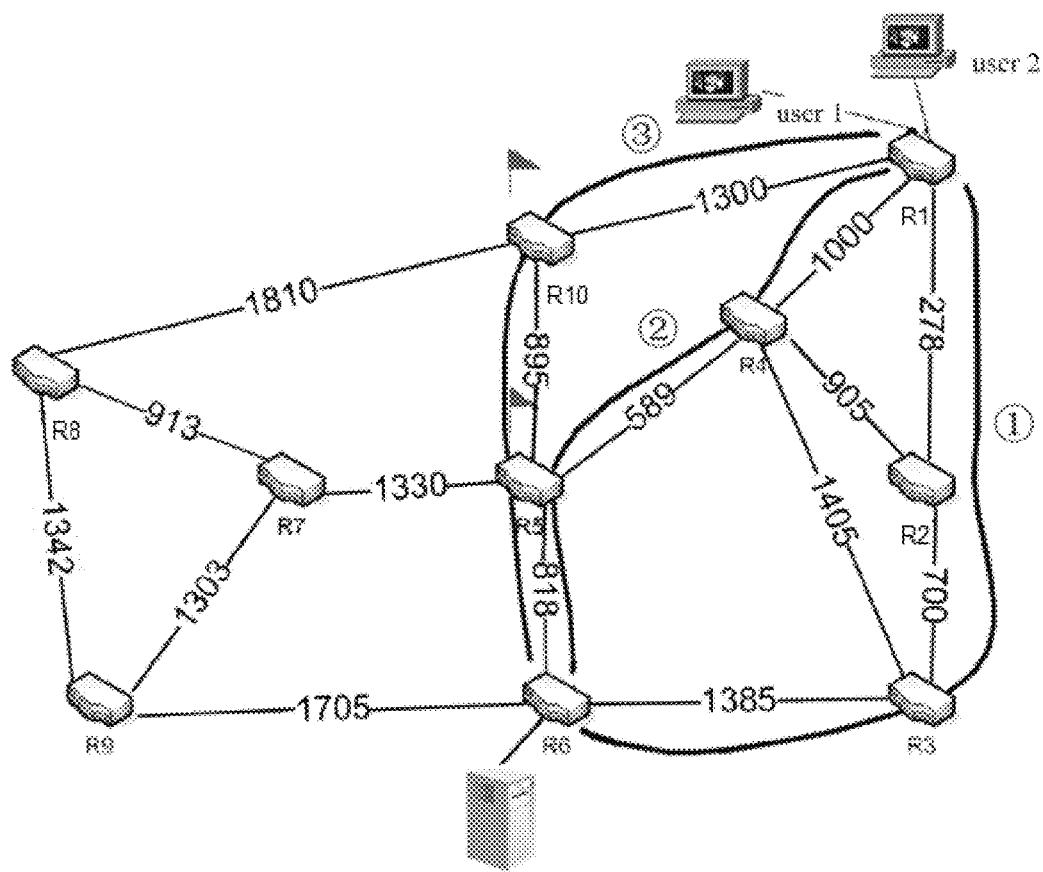
FIG. 4 is a schematic diagram of multipath forwarding of the embodiment as shown in FIG. 3.

Step 2: after receiving a request of the user 1, R1 analyzes the request and calculates multiple paths to the original content provider according to the address of the original content provider. See FIG. 4. FIG. 4 shows multipath information, 3 paths are calculated as a default, and the default may be modified. A method for calculaing multiple paths is: for each outgoing link of R1, calculating a shortest path passing by the outgoing link, if a quantity of outgoing links is less than 3, calculating a secondary shortest path passing by a certain outgoing link until a quantity of necessary paths is satisfied.

Step 3: R1 calculates cost of each path respectively, and a calculation formula is described in the embodiment as shown in FIG. 1.

At this time, R1 receives a request for the content 1 for a first time, R1 performs twice hash calculation to acquire that R5 and R10 are responsible for cashing the content 1, but there is no hit rate information of this two caches, thus a preset default value of 50% hit rate is adopted for calculating to acquire the cost of each path (in FIG. 4 and FIG. 5, a thick curve represents a forwarding path and a fine line represents a topological relation):

$C=2363$ (having no cache and is a shortest path)  path ①

$C=50\%*1589+50\%*2407=1998$  path ②

$C=50\%*1300+50\%*(1300+50\%*895+50\%*1713)=1952$  path ③ a detailed calculation explanation on the cost of the path ③ is as follows:

the path ③ has four nodes in total, where a node 2 (R10) and a node 3 (R5) have caches, the node 1 (R1) is the access router of the user 1, and the node 4 (R6) is the access router of the content provider;

$C=C1,4=\Phi 2R2P1,2+(1-\Phi 2R2)(P1,2+C2,4)$, where, $C2,4=\Phi 3R3P2,3+(1-\Phi 3R3)(P2,3+C3,4)$;

$C3,4=\Phi 4R4P3,4+(1-\Phi 4R4)(P3,4+C4,4)$;

since the node 4 is not responsible for caching, $\Phi 4=0$; while C4, 4=0, thus C3,4=P3,4=818;

the node 3 is responsible for caching, thus $\Phi_3=1$, $R_3=50\%$ acquired by inquiry, thus C2,4=50%×895+50%×(895+818)= 1304;

the node 2 is responsible for caching, thus $\Phi_2=1$, $R_2=50\%$ acquired by inquiry, thus C=C1,4=Φ2R2P1,2+(1−Φ2R2) (P1,2+C2, 4)=1×50%×1300+(1−1×50%)×(1300+1304)= 1952.

The cost of the path ③ is minimum, thus the path ③ is selected as a content acquisition path.

Step 4: R1 carries information of the path ③ in an IP option in a source routing manner and records information of R5 and R10 (including IP addresses of R5 and R10).

Step 5: after receiving the request, R10 extracts the name of the content 1 and because the local cache is responsible for the content, inquires the local cache. The content 1 is not cached locally, a hit rate to the content 1 in the local cache is updated, and a hit rate 40% to the content 1 in the local cache is carried in the IP option of the request packet, and then the request packet is forwarded to R5 according to source routing.

Step 6: after receiving the request, R5 extracts the name of the content 1 and because the local cache is responsible for the content, inquires the local cache. The content 1 is cached locally, a hit rate to the content 1 in the local cache is updated, and a content data packet is generated. A hit rate 60% to the content 1 in the local cache and hit rate information (i.e., hit rate information of the content 1 in other caches) extracted from the request packet are together carried in the IP option of the content data packet and sent to the user. For example, the IP option may include the following information:

| Option type (8 bit) | Option length (8 bit) |
|---|---|
| R10 | 40 |
| R5 | 60 |

Step 7: after receiving the content data packet, R1 extracts hit rate information, updates a hit rate information table (exemplarily shown in the following table) of the local cache, and then sends the content data packet to the user 1.

| Name of content 1 | Cache 1 | Hit rate | Cache 2 | Hit rate |
|---|---|---|---|---|
| ABCD | R10 | 40 | R5 | 60 |

[Specific Implementation Manner 2]

After the user 1 requests the content 1, a user 2 requests the content 1, including:

step 1: the user 2 sends a request packet, where the request packet carries the name of the content 1, the IP address of the original content provider and an IP address of the user 2.

Step 2: after receiving a request of the user 2, R1 analyzes the request and calculates multiple paths to the original content provider according to the address of the original content provider.

Step 3: R1 calculates cost of each path respectively, at this time, according to hit rate information of all caches in the network recorded by R1, where a hit rate of R5 is 60%, and a hit rate of R10 is 40%, the cost of each path is acquired as follows respectively:

$C=2363$ (having no cache and is a shortest path)  path ①

$C=60\%*1589+40\%*2407=1916.2$  path ②

$C=40\%*1300+60\%*(1300+60\%*895+40\%*1713)=2033.32$  path ③

The cost of the path ② is minimum, thus the path ② is selected as a content acquisition path.

Step 4: R1 carries information of the path ② in an IP option of the request packet in a source routing manner and records an address of R5 (or simultaneously recording addresses of R4 and R5).

Step 5: after receiving the request, R5 extracts the name of the content 1 and because the local cache is responsible for the content, inquires the local cache. The content 1 is cached locally, the hit rate to the content 1 in the local cache is updated to 62%, a content data packet is generated, and the hit rate information of the content 1 in the local cache is carried in the IP option of the content data packet to be sent to the user 2.

Step 6: after receiving the content data packet, R1 extracts hit rate information therein, updates the hit rate information table of the local cache, and then sends the content data packet to the user 2.

[Specific Implementation Manner 3]

The scenario of this implementation manner is consistent with the scenario of the specific implementation manner 1, but a method for re-calculating a content acquisition path by an intermediate cache router is adopted instead of the source routing method. In the implementation manner, each cache router needs to record hit rates to a content in all cache routers just like the access router.

Steps 1, 2 and 3 are completely consistent with those in embodiment 1 (not be repeated redundantly herein), path 3 is selected after calculating, and a cache router of a next hop is R10.

Step 4: R1 re-encapsulates a request IP packet, and a target address is R10.

Step 5: after receiving the packet, R10 de-encapsulates the packet, extracts the name of the content 1 from the request and because the local cache is responsible for the content, inquires the local cache. The content 1 is not cached locally, hit rate information of the content 1 in the local cache is updated.

Figure 5:
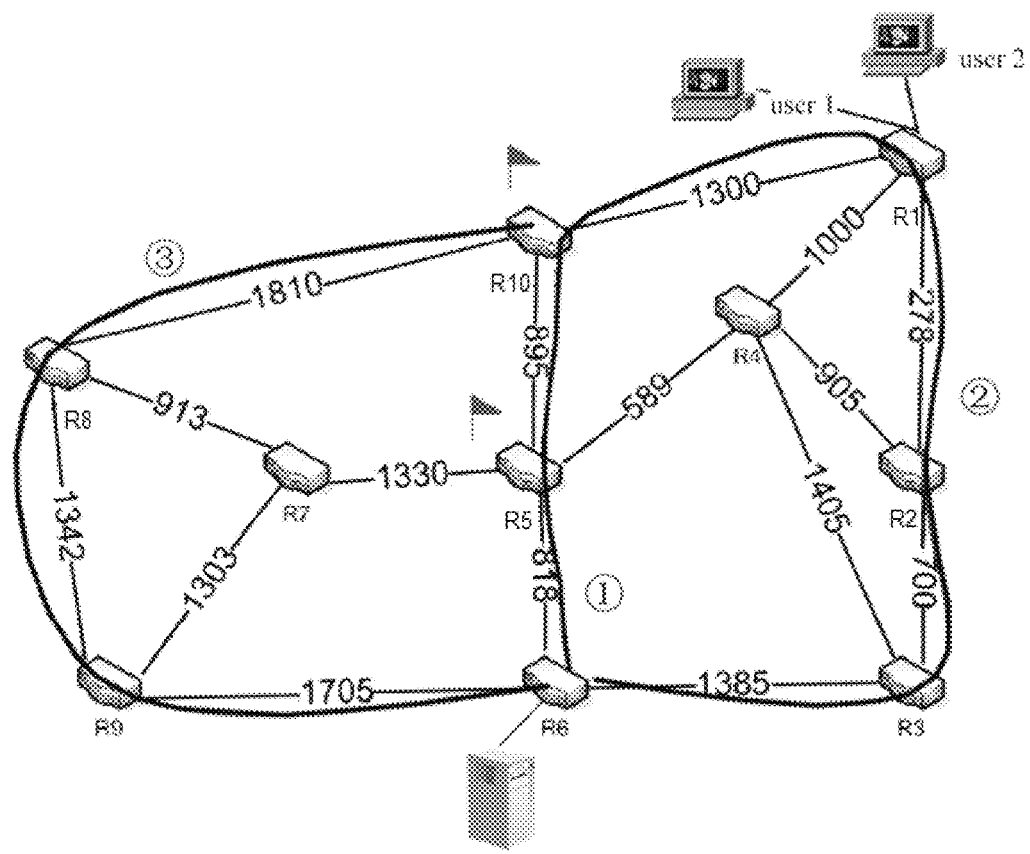
FIG. 5 is another schematic diagram of multipath forwarding of the embodiment as shown in FIG. 3.

Step 6: R10 re-calculates a path to the original content provider (as shown in FIG. 5), calculates cost of each path respectively, at this time, according to hit rate information of all caches in the network recorded by R10, where a hit rate of R5 is 50%. The cost of each path is acquired as follows respectively:

$C=50\%*895+50\%*(985+818)=1349$ (having a cache and is a shortest path)     path ①

$C=3663$ (Having no cache)     path ②

$C=4857$ (Having no cache)     path ③

The cost of the path ① is minimum, thus the path ① is selected.

Step 7: R10 re-encapsulates the request packet, of which the target address is set as R5, and carries a hit rate 40% to the content 1 in the local cache in the IP option.

Step 8: after receiving the packet, R5 decapsulates the packet and extracts the name of the content from the request and because the local cache is responsible for the content, inquires the local cache. The content 1 is cached locally, a hit rate to the content 1 in the local cache is updated to 60%, and a content data packet is generated. Hit rate information of the content 1 in the local cache and hit rate information (i.e., hit rate information of the content 1 in other caches) extracted from the request packet are together carried in the IP option and sent to the user 1.

Step 9: after receiving the content data packet, R1 extracts hit rate information, updates a hit rate information table of the local cache, and then sends the content data packet to the user 1 (since a shortest path is used for returning, namely arriving at R1 passing by R4, R10 could not acquire updated information).

Figure 6A:
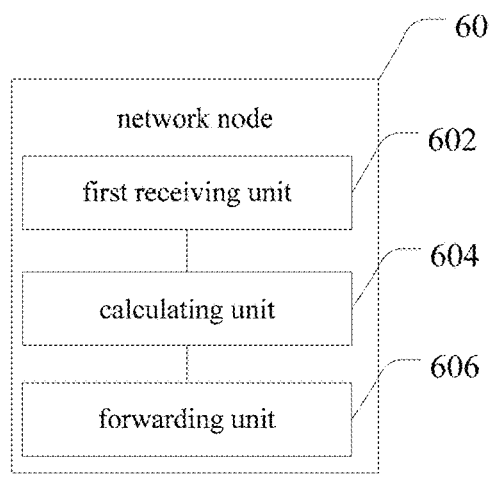
FIG. 6A is a schematic block diagram of a network node for determining a content acquisition path according to an embodiment of the present disclosure.

FIG. 6A is a schematic block diagram of a network node for determining a content acquisition path according to an embodiment of the present disclosure, and see FIG. 6A, the network node 60 includes:

a first receiving unit 602, configured to receive a request from a user, where the request is used for requesting an original content provider to provide a content, and the request carries a name of the content, a network address of the original content provider and a network address of the user;

a calculating unit 604, configured to calculate at least two forwarding paths to the original content provider, and determine a content acquisition path according to link cost on each forwarding path and a cache hit rate of a network node on each forwarding path to the content;

a forwarding unit 606, configured to send the request to a next network node according to the content acquisition path, for enabling the next network node to forward or respond to the request.

Figure 6B:
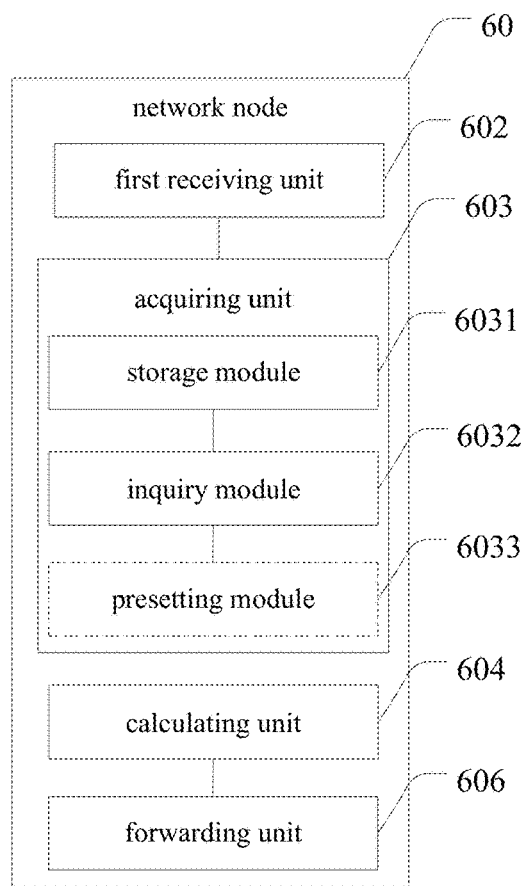
FIG. 6B is a schematic block diagram of a calculating unit in the embodiment as shown in FIG. 6A.

Optionally, in an implementation manner of the embodiment, see FIG. 6B, the network node 60 further includes an acquiring unit 603, configured to acquire the hit rate of the network node on each forwarding path to the content. Of course, the acquiring unit 603 may also serve as a subunit of the calculating unit 604. Exemplarily, the acquiring unit 603 includes:

a storage module 6031, configured to store cache hit rate information of each network node in a network;

an inquiry module 6032, configured to inquire the cache hit rate of the network node on each forwarding path to the content through the storage module, or inquire a cache hit rate of a cache network node on each forwarding path to the content through the storage module, where the cache network node is a network node responsible for caching the content.

Further optionally, the acquiring unit 603 may further include:

a presetting module 6033, where the module is invoked only when there is at least one network node of which a cache hit rate to the content could not be determined through the inquiry module, and the presetting module 6033 is configured to preset the cache hit rate of the at least one network node to the content according to a whole hit rate condition of the at least one network node.

Figure 6C:
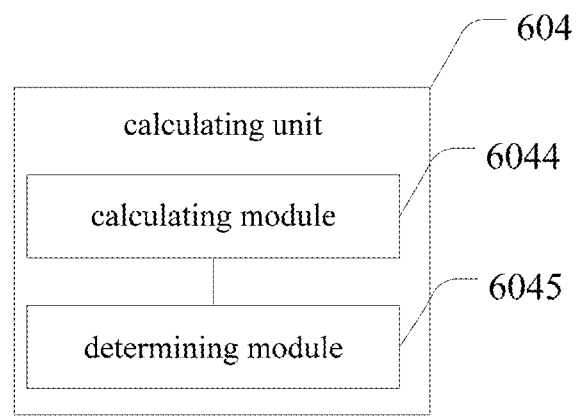
FIG. 6C is another schematic block diagram of a calculating unit in the embodiment as shown in FIG. 6A.

Optionally, in an implementation manner of the embodiment, see FIG. 6C, the calculating unit 604 includes:

a calculating module 6044, configured to calculate path cost $C=C_{1,n}$ of each forwarding paths respectively (with respect to a detailed description of the calculation formula, please see the description in the embodiment as shown in FIG. 1);

a determining module 6045, configured to select a forwarding path with a minimum path cost from the at least two forwarding paths as the content acquisition path.

Figure 7:
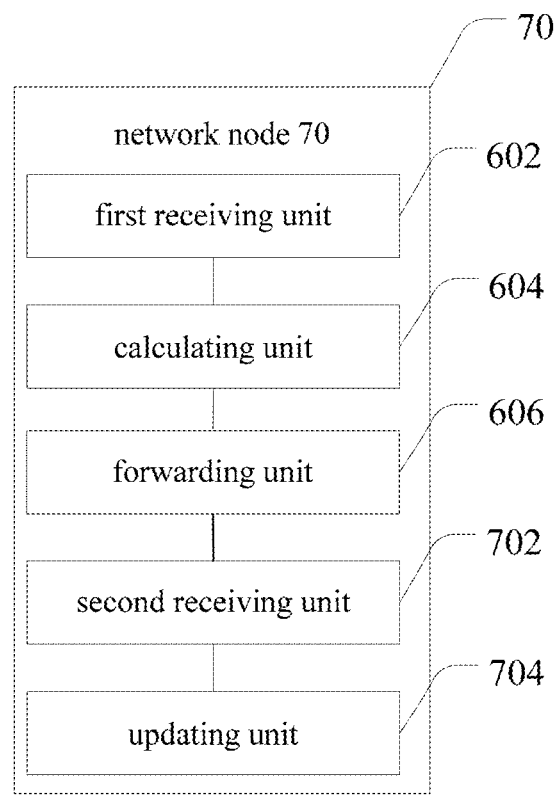
FIG. 7 is a schematic block diagram of a network node for determining a content acquisition path according to an embodiment of the present disclosure.

FIG. 7 is a schematic block diagram of a network node for determining a content acquisition path according to an embodiment of the present disclosure, see FIG. 7, the network node 70 includes a first receiving unit 602, a calculating unit 604 and a forwarding unit 606 (for illustration to the first receiving unit 602, the calculating unit 604 and the forwarding unit 606, please refer to corresponding illustration in the embodiment as shown in FIG. 6), and:

a second receiving unit 702, configured to receive a content data packet generated by a cache network node hitting the content or generated by the original content provider, where the content data packet carries hit rate information of all cache network nodes passed by the request to the content;

an updating unit 704, configured to extract the hit rate information in the content data packet, and update hit rate information of corresponding network nodes to the content stored locally.

Of course, the network node 70 may also include the acquiring unit 603, or the acquiring unit 603 is used as the subunit of the calculating unit 604.

Those skilled in the art should understand that, the network nodes in the embodiments as shown in FIG. 6A and FIG. 7 may be used for achieving functions of the first network node in the method embodiment, for detailed illustration to each unit/module, please refer to corresponding illustration in the method embodiment, and it will not be repeated redundantly herein.

Figure 8A:
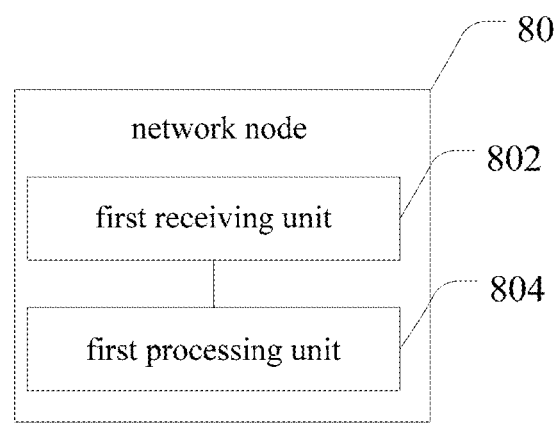
FIG. 8A is a schematic block diagram of a cache network node according to an embodiment of the present disclosure.

FIG. 8A is a schematic block diagram of a cache network node according to an embodiment of the present disclosure, and as shown in FIG. 8A, the network node 80 includes:

a first receiving unit 802, configured to receive a request from a user, where the request is used for requesting an original content provider to provide a content, the request carries a name of the content, a network address of the original content provider and a network address of the user, and the cache network node is a network node responsible for caching the content;

a first processing unit 804, configured to check a local cache and perform a process according to a hit condition of the local cache to the content, including:

if hitting the content, updating a hit rate of the local cache to the content, generating a content data packet, and sending the content data packet to the user as a response to the request, where the content data packet carries hit rate information of the cache network node to the content, or, if not hitting the content, updating a hit rate of the local cache to the content, and sending the request to the original content provider after performing the following process on the request: carrying hit rate information of the cache network node to the content in the request.

Figure 8B:
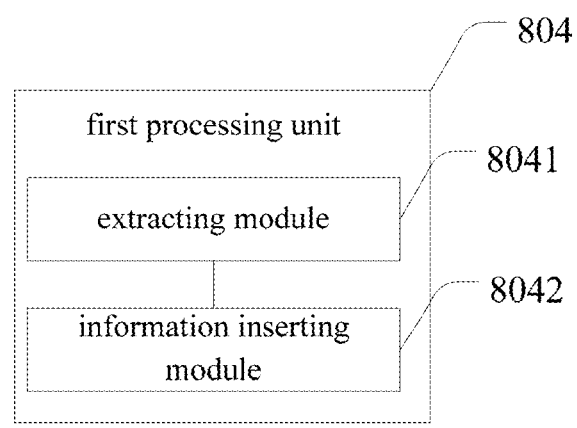
FIG. 8B is a schematic block diagram of a processing unit in the embodiment as shown in FIG. 8A.

Optionally, in an implementation manner of the embodiment (applicable to a scenario hitting the content), see FIG. 8B, the first processing unit 804 includes:

an extracting module 8041, configured to, in a condition that the cache network node 80 hits the content and the request further carries hit rate information of other cache network nodes to the content, extract the hit rate information, where the other cache network nodes are nodes passed by the request before arriving at the cache network node 80;

an information inserting module 8042, configured to carry the hit rate information extracted by the extracting module 8041 in the content data packet.

Figure 8C:
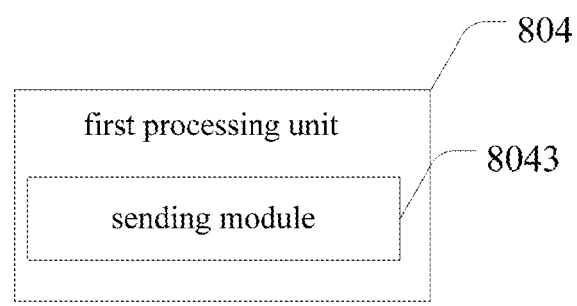
FIG. 8C is a schematic block diagram of a processing unit in the embodiment as shown in FIG. 8A

Optionally, in an implementation manner of the embodiment (applicable to a scenario not hitting the content), see FIG. 8C, the first processing unit 804 includes:

a sending module 8043, configured to, in a condition that the cache network node 80 does not hit the content, determine a next hop according to content acquisition path information carried in the request, or, configured to, in a condition that the cache network node 80 does not hit the content, calculate at least two forwarding paths to the original content provider, determine a content acquisition path according to link cost on each forwarding path and a cache hit rate of a network node on each forwarding path to the content, and determine a next hop according to the determined content acquisition path.

Figure 9:
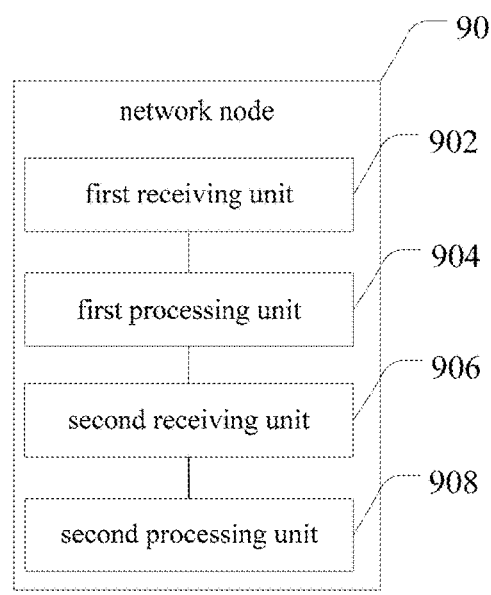
FIG. 9 is a schematic block diagram of a cache network node according to an embodiment of the present disclosure.

FIG. 9 is a schematic block diagram of a cache network node according to an embodiment of the present disclosure, and see FIG. 9, the network node 90 includes:

a first receiving unit 902, having the same function as the first receiving unit 802 in the embodiment as shown in FIG. 8;

a first processing unit 904, configured to check a local cache, and perform a process according to a hit condition of the local cache to the content, if not hitting, update a hit rate of the local cache to the content, and send the request to the original content provider after performing the following process on the request: carrying hit rate information of the cache network node 90 to the content in the request;

a second receiving unit 906, configured to receive a content data packet generated by a cache network node hitting the content or generated by the original content provider, where the content data packet carries hit rate information of all cache network nodes passed by the request to the content;

a second processing unit 908, configured to send the content data packet to the user, or extract the hit rate information in the content data packet, update hit rate information of corresponding network nodes to the content stored locally, and send the content data packet to the user.

Optionally, in an implementation manner of the embodiment, the first processing unit 904 may include the sending module 8043 in the implementation manner as shown in FIG. 8C.

Those skilled in the art should understand that, the cache network nodes in the embodiments as shown in FIG. 8A and FIG. 9 may be used for achieving functions of the cache network node in the method embodiment, for detailed illustration to each unit/module, please refer to corresponding illustration in the method embodiment, and it will not be repeated redundantly herein.

Figure 10:
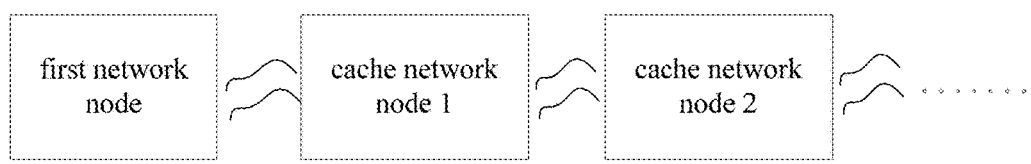
FIG. 10 is a schematic block diagram of a system for acquiring a content according to an embodiment of the present disclosure.

FIG. 10 is a schematic block diagram of a system for acquiring a content according to an embodiment of the present disclosure, and see FIG. 10, the system includes: a first network node and at least one cache network node. The first network node receives a request from a user and used for requesting an original content provider to provide a content, the first network node determines a content acquisition path to forward the request, the cache network node passed by the request in a forwarding process may judge whether a local cache hits the content, two possibilities, hitting and not hitting, exist, specifically, description of the first network node and the cache network node and description of a communication relationship of the two refer to corresponding illustration in the method and apparatus embodiments of the present disclosure, and will not be repeated redundantly herein.

Optionally, in an implementation manner of the embodiment, all of the at least one cache network node do not hit the content, at this time, the system further includes the original content provider, and the original content provider returns the content to the user and returns cache hit rate information of the at least one cache network node to the content.

Figure 11:
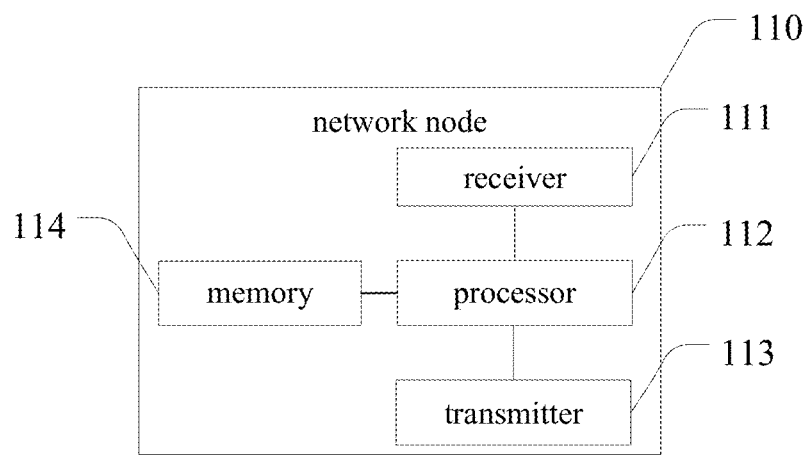
FIG. 11 is a schematic block diagram of a network node according to an embodiment of the present disclosure.

FIG. 11 is a schematic block diagram of a network node according to an embodiment of the present disclosure, see FIG. 11, the network node 110 includes a receiver 111, a processor 112, a transmitter 113 and a memory 114, where the processor 112 is connected with the receiver 111, the memory 114 and the transmitter 113, and the memory 114 stores various protocols, programs or applications to be invoked by the processor 112 to achieve the following functions;

receiving a request from a user through the receiver 111, where the request is used for requesting an original content provider to provide a content, and the request carries a name of the content, a network address of the original content provider and a network address of the user;

calculating at least two forwarding paths to the original content provider, and determining a content acquisition path according to link cost on each forwarding path and a cache hit rate of a network node on each forwarding path to the content; and sending the request to a next network node according to the content acquisition path by the transmitter 113, for enabling the next network node to forward or respond to the request.

Optionally, in an implementation manner of the embodiment, the memory 114 stores a cache hit rate information table, for enabling the processor 112 to inquire the cache hit rate of the network node on each forwarding path to the content in the cache hit rate information table, or inquire a cache hit rate of a cache network node on each forwarding path to the content in the cache hit rate information table, where the cache network node is a network node responsible for caching the content; optionally, if there is at least one network node of which a cache hit rate to the content could not be acquired by inquiring the cache hit rate information table, the processor 112 may preset the cache hit rate of the at least one network node to the content according to a whole hit rate condition of the at least one network node.

Optionally, in an implementation manner of the embodiment, the processor 112 determines the content acquisition path in the following manner calculating path cost $C=C_{1,n}$ of each forwarding path respectively (detailed illustration of the formula is same as that mentioned above and will not be repeated redundantly herein); and selecting a forwarding path with a minimum path cost from the at least two forwarding paths as the content acquisition path.

Optionally, in an implementation manner of the embodiment, the processor 112 further receives a content data packet generated by a network node responsible for caching the content and hitting the content (i.e., a cache network node hitting the content) or generated by the original content provider by the receiver 111, where the content data packet carries hit rate information of all cache network nodes passed by the request to the content; at this time, the processor 112 is further configured to extract the hit rate information in the content data packet, and update hit rate information of corresponding network nodes stored in the memory 114.

Figure 12:
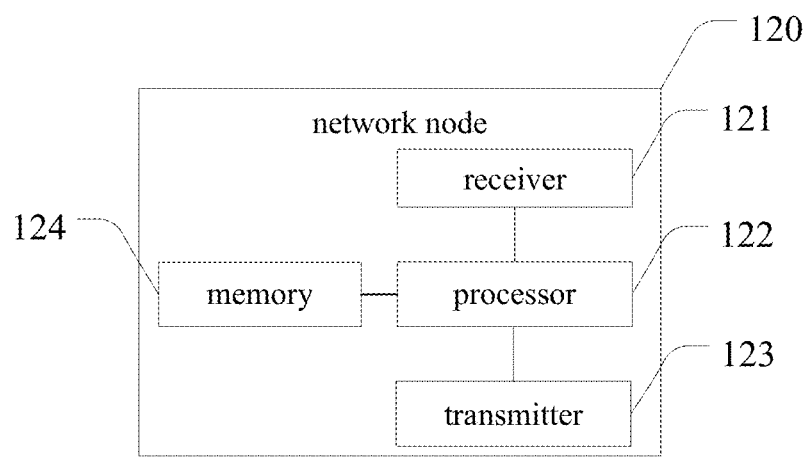
FIG. 12 is a schematic block diagram of a network node according to an embodiment of the present disclosure.

FIG. 12 is a schematic block diagram of a network node according to an embodiment of the present disclosure, see FIG. 12, the network node 120 has a cache function and includes a receiver 121, a processor 122, a transmitter 123 and a memory 124, where the processor 122 is connected with the receiver 121, the memory 124 and the transmitter 123, and the memory 124 stores various protocols, programs or applications to be invoked by the processor 122 to achieve the following functions:

receiving a request from a user through the receiver 121, where the request is used for requesting an original content provider to provide a content, the request carries a name of the content, a network address of the original content provider and a network address of the user, the network node 120 belongs to a cache network node, and the cache network node is a network node responsible for caching the content; and checking a local cache (the local cache may be arranged in the memory 124 and may also be a cache processor independent from the memory 124), if hitting the content, updating a hit rate of the local cache to the content (hit rate information may be stored in the memory 124), generating a content data packet, and sending the content data packet to the user by the transmitter 123 as a response to the request, where the content data packet carries hit rate information of the network node 120 to the content; or, if not hitting the content, updating a hit rate of the local cache to the content, and sending the request to the original content provider by the transmitter 123 after performing the following process on the request: carrying hit rate information of the network node 120 to the content in the request.

Optionally, in an implementation manner of the embodiment, the processor 122 is further configured to, in a condition that the content is hit and the request further carries hit rate information of other cache network nodes to the content, extract the hit rate information and carry the hit rate information in the content data packet, where the other cache network nodes are nodes passed by the request before arriving at the network node 120.

Optionally, in an implementation manner of the embodiment, the sending, by the processor 122, the request to the original content provider by the transmitter 123 may include:

determining a next hop according to content acquisition path information carried in the request; or, calculating at least two forwarding paths to the original content provider, determining a content acquisition path according to link cost on each forwarding path and a cache hit rate of a network node on each forwarding path to the content, and determining a next hop according to the determined content acquisition path.

Optionally, in an implementation manner of the embodiment, the processor 122 is further configured to:

receive a content data packet generated by a cache network node hitting the content or generated by the original content provider through the receiver 121, where the content data packet carries hit rate information of all cache network nodes passed by the request to the content; and send the content data packet to the user by the transmitter 123, or extract the hit rate information in the content data packet, update hit rate information of corresponding network nodes to the content stored in the memory 124, and send the content data packet to the user by the transmitter 123.

With respect to detailed function illustration of each module, unit or subassembly of each apparatus embodiment provided by the present disclosure, please refer to illustration in the corresponding method embodiment, and it will not be repeated redundantly in the description.

Those of ordinary skill in the art may understand that all or a part of the flows in the above-mentioned method embodiments may be implemented with a computer program instructing corresponding hardware, the program may be stored in a computer readable storage medium, and when being executed, the program may include the flows of the embodiments of the above-mentioned methods. The storage medium may be a magnetic disk, an optical disk, a read-only memory (ROM), a random access memory (RAM) or the like.

The foregoing descriptions are merely a preferred embodiment of the present disclosure, but the protection scope of the present disclosure is not limited thereto. Therefore, equivalent variations made according to the claims of the present disclosure are still encompassed in the scope of the present disclosure.

What is claimed is:

1. A method for determining a content acquisition path, comprising:

receiving, by a first network node, a request from a user, wherein the request is used for requesting an original content provider to provide a content, and the request carries a name of the content, a network address of the original content provider and a network address of the user;

calculating at least two forwarding paths to the original content provider, and determining a content acquisition path according to link cost on each forwarding path and a cache hit rate of a network node on each forwarding path to the content; and sending the request to a next network node according to the content acquisition path, for enabling the next network node to forward or respond to the request.

2. The method according to claim 1, further comprising:

acquiring the cache hit rate of the network node on the each forwarding path to the content;

the cache hit rate of the network node on the each forwarding path to the content is acquired in the following manners:

inquiring the cache hit rate of the network node on each forwarding path to the content in a cache hit rate information table stored locally, or inquiring a cache hit rate of a cache network node on each forwarding path to the content in the cache hit rate information table, wherein the cache network node is a network node responsible for caching the content; or during the inquiring process, if there is at least one network node of which a cache hit rate to the content could not be acquired by inquiring the cache hit rate information table, presetting the cache hit rate of the at least one network node to the content according to a whole hit rate condition of the at least one network node.

3. The method according to claim 1, wherein the determining the content acquisition path according to the link cost on each forwarding path and the cache hit rate of the network node on each forwarding path to the content, comprises:

calculating path cost $C=C_{1,n}$ of each forwarding path respectively, wherein, $$C_{i,n}=\Phi_{i+1}R_{i+1}P_{i,i+1}+(1-\Phi_{i+1}R_{i+1})(P_{i,i+1}+C_{i+1,n})((i<n),$$

the n is a quantity of network nodes on a forwarding path calculated currently, when a $(i+1)^{th}$ network node in n network nodes is responsible for caching the content, the $\Phi_{i+1}=1$, otherwise, the $\Phi_{i+1}=0$, the $R_{i+1}$ is a cache hit rate of the $(i+1)^{th}$ network node to the content, the $P_{i,i+1}$ is link cost from a $i^{th}$ network node to the $(i+1)^{th}$ network node in the n network nodes, and the $C_{i,n}$ is path cost from the $i^{th}$ network node to a $n^{th}$ network node in the n network nodes; and selecting a forwarding path with a minimum path cost from the at least two forwarding paths as the content acquisition path.

4. The method according to claim 2, further comprising:

receiving a content data packet generated by a cache network node hitting the content or generated by the original content provider, wherein the content data packet carries hit rate information of all cache network nodes passed by the request to the content; and extracting the hit rate information in the content data packet, and updating hit rate information of corresponding network nodes to the content stored locally.

5. A method for processing a request, comprising:

receiving, by a cache network node, a request from a user, wherein the request is used for requesting an original content provider to provide a content, the request carries a name of the content, a network address of the original content provider and a network address of the user, and the cache network node on a content acquisition path is responsible for caching the content, and the content acquisition path is determined according to link cost on each forwarding path of at least two forwarding paths from the user to the original content provider and a cache hit rate of a network node on each forwarding path to the content;

checking a local cache, if hitting the content, updating a hit rate of the local cache to the content, generating a content data packet, and sending the content data packet to the user as a response to the request, wherein the content data packet carries hit rate information of the cache network node to the content; or, checking a local cache, if not hitting the content, updating a hit rate of the local cache to the content, and sending the request to the original content provider after performing the following process on the request: carrying hit rate information of the cache network node to the content in the request.

6. The method according to claim 5, wherein in a condition that the cache network node hits the content, if the request further carries hit rate information of other cache network nodes to the content, the cache network node extracts the hit rate information and carries the hit rate information in the content data packet, wherein the other cache network nodes are nodes passed by the request before arriving at the cache network node.

7. The method according to claim 5, wherein in a condition that the cache network node does not hit the content, the sending the request to the original content provider after performing the following process on the request comprises:

determining, by the cache network node, a next hop according to content acquisition path information carried in the request; or, calculating, by the cache network node, at least two forwarding paths to the original content provider, determining a content acquisition path according to link cost on each forwarding path and a cache hit rate of a network node on each forwarding path to the content, and determining a next hop according to the determined content acquisition path.

8. The method according to claim 5, wherein in a condition that the cache network node does not hit the content, the method further comprises:

receiving, by the cache network node, a content data packet generated by a cache network node hitting the content or generated by the original content provider, wherein the content data packet carries hit rate information of all cache network nodes passed by the request to the content;

sending the content data packet to the user; or, extracting the hit rate information in the content data packet, updating hit rate information of corresponding network nodes to the content stored locally, and sending the content data packet to the user.

9. A network node for determining a content acquisition path, comprising:
- a receiver, configured to receive a request from a user, wherein the request is used for requesting an original content provider to provide a content, and the request carries a name of the content, a network address of the original content provider and a network address of the user;
- a processor, configured to calculate at least two forwarding paths to the original content provider, and determine a content acquisition path according to link cost on each forwarding path and a cache hit rate of a network node on each forwarding path to the content; and
- a transmitter, configured to send the request to a next network node according to the content acquisition path, for enabling the next network node to forward or respond to the request.

10. The network node according to claim 9, the processor is further configured to acquire the cache hit rate of the network node on the each forwarding path to the content;
- wherein the processor is configured to acquire the cache hit rate of the network node on the each forwarding path to the content in the following manner:
- inquiring the cache hit rate of the network node on each forwarding path to the content in a cache hit rate information table stored locally, or inquiring a cache hit rate of a cache network node on each forwarding path to the content in the cache hit rate information table, wherein the cache network node is a network node responsible for caching the content.

11. The network node according to claim 9, the processor is further configured to acquire the cache hit rate of the network node on the each forwarding path to the content;
- wherein the processor is configured to acquire the cache hit rate of the network node on the each forwarding path to the content in the following manner:
- during the inquiring process, if there is at least one network node of which a cache hit rate to the content could not be acquired by inquiring the cache hit rate information table, presetting the cache hit rate of the at least one network node to the content according to a whole hit rate condition of the at least one network node.

12. The network node according to claim 9, wherein the processor is configured to calculate path costs $C=C_{1,n}$ of each forwarding path respectively, wherein, $$C_{i,n}=\Phi_{i+1}R_{i+1}P_{i,i+1}+(1-\Phi_{i+1}R_{i+1})(P_{i,i+1}+C_{i+1,n})((i<n),$$

the n is a quantity of network nodes on a forwarding path calculated currently; when a $(i+1)^{th}$ network node in n network nodes is responsible for caching the content, the $\Phi_{i+1}=1$, otherwise, the $\Phi_{i+1}=0$; the $R_{i+1}$ is a cache hit rate of the $(i+1)^{th}$ network node to the content; the $P_{i,i+1}$ is link cost from a $i^{th}$ network node to the $(i+1)^{th}$ network node in the n network nodes; and the $C_{i,n}$ is path cost from the $i^{th}$ network node to a $n^{th}$ network node in the n network nodes; and select a forwarding path with a minimum path cost from the at least two forwarding paths as the content acquisition path.

13. The network node according to claim 10, the receiver is further configured to receive a content data packet generated by a cache network node hitting the content or generated by the original content provider, wherein the content data packet carries hit rate information of all cache network nodes passed by the request to the content; and
- the processor is further configured to extract the hit rate information in the content data packet, and update hit rate information of corresponding network nodes to the content stored locally.

14. The network node according to claim 11, the receiver is further configured to receive a content data packet generated by a cache network node hitting the content or generated by the original content provider, wherein the content data packet carries hit rate information of all cache network nodes passed by the request to the content; and
- the processor is further configured to extract the hit rate information in the content data packet, and update hit rate information of corresponding network nodes to the content stored locally.

15. A cache network node, comprising:
- a receiver, configured to receive a request from a user, wherein the request is used for requesting an original content provider to provide a content, the request carries a name of the content, a network address of the original content provider and a network address of the user, and the cache network node on a content acquisition path is responsible for caching the content, and the content acquisition path is determined according to link cost on each forwarding path of at least two forwarding paths from the user to the original content provider and a cache hit rate of a network node on each forwarding path to the content; and
- a processor, configured to check a local cache and perform a process according to a hit condition of the local cache to the content, including:
- if hitting the content, updating a hit rate of the local cache to the content, generating a content data packet, and sending the content data packet to the user as a response to the request, wherein the content data packet carries hit rate information of the cache network node to the content; or,
- if not hitting the content, updating a hit rate of the local cache to the content, and sending the request to the original content provider after performing the following process on the request: carrying hit rate information of the cache network node to the content in the request.

16. The cache network node according to claim 15, wherein the processor is further configured to, in a condition that the cache network node hits the content and the request further carries hit rate information of other cache network nodes to the content, extract the hit rate information, wherein the other cache network nodes are nodes passed by the request before arriving at the cache network node; and
- carry the hit rate information extracted by the extracting module in the content data packet.

17. The cache network node according to claim 15, wherein the processor is further configured to, in a condition that the cache network node does not hit the content, determine a next hop according to content acquisition path information carried in the request; or,
- in a condition that the cache network node does not hit the content, calculate at least two forwarding paths to the original content provider, determine a content acquisition path according to link cost on each forwarding path and a cache hit rate of a network node on each forwarding path to the content, and determine a next hop according to the determined content acquisition path.

18. The cache network node according to claim 16, the receiver is further configured to, in a condition that the cache network node does not hit the content, receive a content data packet generated by a cache network node hitting the content or generated by the original content provider, wherein the content data packet carries hit rate information of all cache network nodes passed by the request to the content; and the processor is further configured to send the content data packet to the user.

19. The cache network node according to claim 16, the receiver is further configured to, in a condition that the cache network node does not hit the content, receive a content data packet generated by a cache network node hitting the content or generated by the original content provider, wherein the content data packet carries hit rate information of all cache network nodes passed by the request to the content; and the processor is further configured to extract the hit rate information in the content data packet, update hit rate information of corresponding network nodes to the content stored locally, and send the content data packet to the user.

* * * * *